(12) United States Patent
Gellatly et al.

(10) Patent No.: US 9,177,474 B2
(45) Date of Patent: Nov. 3, 2015

(54) VEHICLE NAVIGATION SYSTEM AND METHOD

(75) Inventors: Andrew W. Gellatly, Macomb, MI (US); Axel Nix, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 797 days.

(21) Appl. No.: 12/883,843

(22) Filed: Sep. 16, 2010

(65) Prior Publication Data

US 2011/0224864 A1 Sep. 15, 2011

Related U.S. Application Data

(60) Provisional application No. 61/314,033, filed on Mar. 15, 2010.

(51) Int. Cl.

| | |
|---|---|
| *G08G 1/133* | (2006.01) |
| *B60R 16/023* | (2006.01) |
| *G07C 5/00* | (2006.01) |
| *G01C 21/36* | (2006.01) |
| *G08G 1/0962* | (2006.01) |

(52) U.S. Cl.
CPC ............ *G08G 1/133* (2013.01); *B60R 16/0234* (2013.01); *G01C 21/3679* (2013.01); *G07C 5/006* (2013.01); *G07C 5/008* (2013.01); *G08G 1/0962* (2013.01)

(58) Field of Classification Search
CPC .... G07C 5/006; G07C 5/0816; G07C 5/0825; G07C 5/0833; G01C 21/3679; G08G 1/133; G06Q 30/0266; H04W 4/02; H04W 4/04; H04W 4/046; B60R 16/0234
USPC ............. 701/454, 516, 300, 29.1, 29.2, 29.4, 701/29.5, 31.4, 31.5, 31.6, 31.9, 32.3, 32.4, 701/32.5, 33.6; 340/425.5, 438, 442, 340/450–455, 457, 457.4, 458; 705/14.63
See application file for complete search history.

(56) References Cited

U.S. PATENT DOCUMENTS

| | | | |
|---|---|---|---|
| 4,973,952 A | 11/1990 | Malec et al. | |
| 5,608,449 A | 3/1997 | Swafford, Jr. et al. | |
| 6,882,290 B2 | 4/2005 | French et al. | |
| 2004/0128067 A1* | 7/2004 | Smith | 701/207 |
| 2005/0024189 A1* | 2/2005 | Weber | 340/425.5 |
| 2006/0136130 A1* | 6/2006 | Isaac | 701/219 |
| 2007/0090937 A1 | 4/2007 | Stabler | |
| 2008/0030378 A1* | 2/2008 | Hamrick et al. | 340/991 |

(Continued)

FOREIGN PATENT DOCUMENTS

| | | |
|---|---|---|
| CN | 101136142 A | 3/2008 |
| CN | 101493332 A | 7/2009 |
| CN | 101544214 A | 9/2009 |

OTHER PUBLICATIONS

Findlater, L., et al. "A Comparison of Static, Adaptive, and Adaptable Menus," Proceedings of the SIGCHI Conference on Human Factors in Computing Systems, 2004, pp. 89-96, vol. 6, No. 1.

(Continued)

*Primary Examiner* — Spencer Patton (74) *Attorney, Agent, or Firm* — Ingrassia Fisher & Lorenz, P.C.

(57) ABSTRACT

Methods and systems are provided for a vehicle. A determination is made as to whether the vehicle requires a service. A determination is also made as to whether the vehicle is proximate a location at which the service can be performed. A notification is provided that the vehicle requires the service and is proximate the location.

29 Claims, 3 Drawing Sheets

(56) References Cited

U.S. PATENT DOCUMENTS

2009/0024318 A1* 1/2009 Sakai ............................ 701/209
2010/0188202 A1* 7/2010 Kuchler et al. ............... 340/442

OTHER PUBLICATIONS

USPTO "Non-Final Office Action" mailed Oct. 24, 2012. U.S. Appl. No. 13/080,526, filed Apr. 5, 2011.

USPTO, Final Office Action for U.S. Appl. No. 13/080,526, mailed Feb. 28, 2013.

China Patent & Trademark Office, Office Action for Chinese Patent Application No. 201110061715.4, mailed Apr. 17, 2013.

State Intellectual Property Office of the People's Republic of China, Office Action for Chinese Patent Application No. 201110061715.4, mailed Dec. 3, 2013.

\* cited by examiner

VEHICLE NAVIGATION SYSTEM AND METHOD

CROSS REFERENCE TO RELATED APPLICATION

This application claims the benefit of U.S. Provisional Application No. 61/314,033 filed Mar. 15, 2010, the entirety of which is incorporated by reference herein.

TECHNICAL FIELD

The present disclosure generally relates to the field of vehicles and, more specifically, to methods and systems for use in conjunction with vehicle navigation systems.

BACKGROUND

Many vehicles today include vehicle navigation systems that provide information to the occupants of the vehicle as to a location of the vehicle. Often, the navigation systems also provide lists including various points of interest or locations. For example, such lists often include lists of nearby restaurants, service stations, hotels, retail stores, or other locations.

However, the full potential of vehicle navigation systems has yet to be realized. For example, existing vehicle navigation systems may not provide as much information as would be optimal under various circumstances. In addition, existing vehicle navigation systems may not provide information to the occupants of the vehicle in a manner that is tailored to the occupants with an optimal amount of specificity under certain circumstances.

SUMMARY

In accordance with an exemplary embodiment, a method is provided. The method comprises the steps of determining if a vehicle requires a service, determining if the vehicle is proximate a location at which the service can be performed, and providing a notification that the vehicle requires the service and is proximate the location.

In accordance with another exemplary embodiment, a method is provided. The method comprises the steps of identifying a plurality of locations proximate a vehicle, determining a respective relevancy score for each of the plurality of locations using a location history for the vehicle, and displaying information pertaining to the plurality of locations in accordance with their respective relevancy scores.

In accordance with a further exemplary embodiment, a system is provided. The system includes a processor and a display. The processor is configured to receive information pertaining to needs of a vehicle, determine, using the information, if the vehicle requires a service, and determine if the vehicle is proximate a location at which the service can be performed. The display is coupled to the processor, and is configured to provide a notification that the vehicle requires the service and is proximate the location.

In accordance with another exemplary embodiment, a method is provided. The method comprises the steps of determining a time of day, identifying a plurality of locations proximate a vehicle, determining a respective relevancy score for each of the plurality of locations using the time of day, and displaying information pertaining to the plurality of locations in accordance with their respective relevancy scores.

In accordance with a further exemplary embodiment, a system is provided. The system comprises a processor and a display. The processor is configured to determine a time of day, identify a plurality of locations proximate a vehicle, and determine a respective relevancy score for each of the plurality of locations using the time of the day. The display is coupled to the processor, and is configured to display information pertaining to the plurality of locations in accordance with their respective relevancy scores.

In accordance with another exemplary embodiment, a method is provided. The method comprises the steps of determining a day of a week, identifying a plurality of locations proximate a vehicle, determining a respective relevancy score for each of the plurality of locations using the day of the week, and displaying information pertaining to the plurality of locations in accordance with their respective relevancy scores.

In accordance with a further exemplary embodiment, a system is provided. The system comprises a processor and a display. The processor is configured to determine a day of a week, identify a plurality of locations proximate a vehicle, and determine a respective relevancy score for each of the plurality of locations using the day of the week. The display is coupled to the processor, and is configured to display information pertaining to the plurality of locations in accordance with their respective relevancy scores.

In accordance with another exemplary embodiment, a system is provided. The system comprises a processor and a display. The processor is configured to identify a plurality of locations proximate a vehicle, and determine a respective relevancy score for each of the plurality of locations using a location history for the vehicle. The display is coupled to the processor, and is configured to display information pertaining to the plurality of locations in accordance with their respective relevancy scores/

Furthermore, other desirable features and characteristics of the methods and systems will be apparent from the subsequent detailed description and the appended claims, taken in conjunction with the accompanying drawings and the foregoing technical field and background.

BRIEF DESCRIPTION OF THE DRAWINGS

Certain embodiments of the present disclosure will hereinafter be described in conjunction with the following drawing figures, wherein like numerals denote like elements, and wherein.

DETAILED DESCRIPTION

The following detailed description is merely exemplary in nature, and is not intended to limit the disclosure or the application and uses thereof. Furthermore, there is no intention to be bound by any expressed or implied theory presented in the preceding technical field, background, or the following detailed description.

Figure 1:
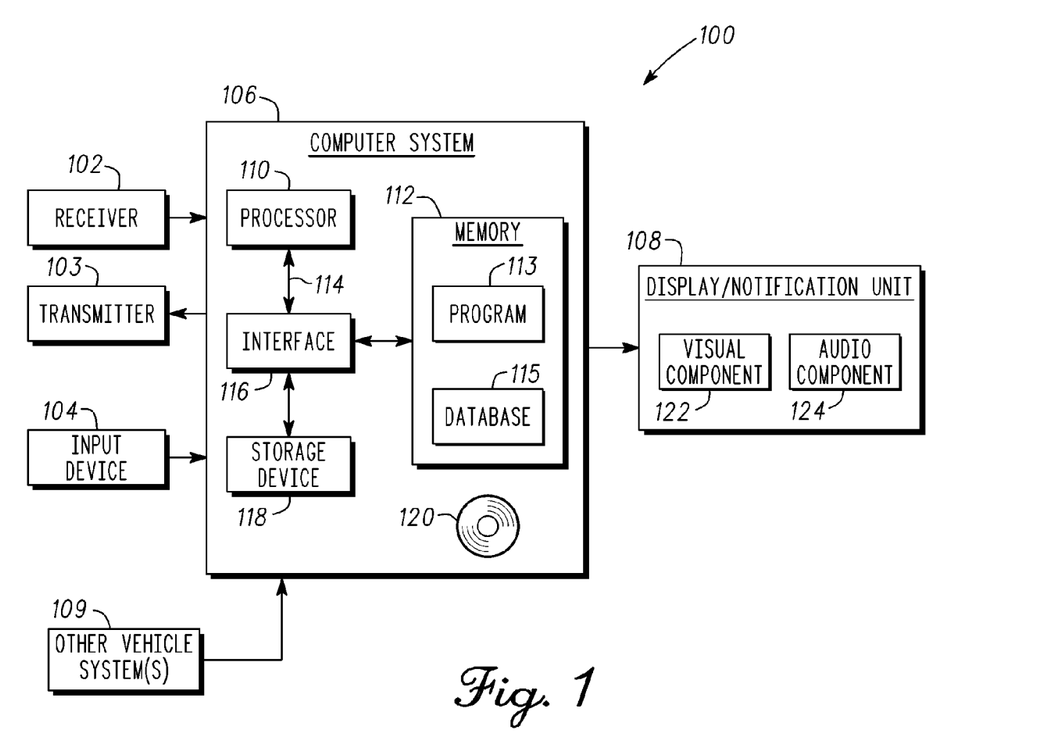
FIG. 1 is a functional block diagram of a navigation system for a vehicle, in accordance with an exemplary embodiment.

FIG. 1 is a functional block diagram of a navigation system 100 for a vehicle. The navigation system 100 provides an optimized display and notification regarding various points of interest near the vehicle based on user history and preferences, and regarding conditions, actions, and/or other service needs pertaining to the vehicle (also referenced herein as services required by the vehicle) that may be related to a point of interest near the vehicle. As used throughout this application, a point of interest refers to any location (e.g., hotels, restaurants, retail stores, service stations, and/or other locations) that may be of interest to the occupants of a vehicle. In certain embodiments, the navigation system 100 is used in conjunction with an automobile, such as a sedan, a truck, a van, a sport utility vehicle, or another type of automobile. In various other embodiments, the navigation system 100 is used in connection with one or more other types of vehicles.

In the embodiment shown in FIG. 1, the navigation system 100 includes a receiver 102, a transmitter 103, an input device 104, a computer system 106, and a display and notification unit 108. In one embodiment, the navigation system 100 is disposed within or onboard the vehicle. In certain embodiments, various components of the navigation system 100 could be off-board or remote from the vehicle.

The receiver 102 is configured to receive signals and/or information pertaining to the vehicle and various points of interest (POI) that may be near the vehicle and/or a path of the vehicle. The receiver 102 receives signals and information regarding a current geographic position or location of the vehicle. In certain exemplary embodiments, the receiver 102 also receives signals and information regarding locations of the points of interest and/or user history regarding prior visits to the points of interest and/or preferences regarding the points of interest. In addition, the receiver 102 preferably also receives information from various other vehicle systems and/or components as to states or conditions pertaining to the vehicle, actions that may be required for the vehicle (for example, as to whether the oil needs to be changed, whether the washer fluid needs to be replenished, whether a light bulb needs to be replaced, weather a brake pad needs to be replaced, and the like), and/or other services required by the vehicle.

In one exemplary embodiment, the receiver 102 receives signals and information, including a signal representing a current position or location of the vehicle, from one or more satellites or as part of a global positioning system (GPS). In addition, the receiver 102 preferably receives signals and information from a remote, off-board database or processor that resides away from the vehicle, for example via a wireless communications network. The receiver 102 provides the signals and/or information to the computer system 106 for processing, and ultimately for use in providing information and notifications to occupants of the vehicle.

The transmitter 103 is configured to transmit signals and/or information pertaining to the vehicle and various points of interest (POI) that may be near the vehicle and/or a path of the vehicle. In one exemplary embodiment, the transmitter 103 transmits signals and information regarding a current geographic position or location of the vehicle. In addition, the transmitter 103 may also transmit signals and information regarding locations of the points of interest and/or user history regarding prior visits to the points of interest and/or preferences regarding the points of interest.

The transmitter 103 preferably transmits signals and information via instructions provided by the computer system 106. The transmitter 103 also preferably transmits signals and information to a remote database or processor that resides off-board and away from the vehicle, for example via a wireless communications network, for storage and/or processing by the remote database or processor. In certain embodiments a transmitter 103 may not be necessary. For example, the storage and/or processing of the signals and information may be performed entirely within the computer system 106.

The input device 104 is configured to obtain inputs from a user, preferably from one or more occupants of the vehicle. The user may use the input device 104 to request that the navigation system 100 display certain types of information, such as specific types of points of interest in which the user may be interested. In addition, the user may use the input device 104 to provide various information regarding specific points of interest, such as preferences or ratings of the user pertaining to specific points of interest. For example, after visiting a particular restaurant, hotel, service station, retail store, or other point of interest, the user may provide feedback via the input device 104 as to the user's experience at the point of interest. The feedback may then be provided directly to the computer system 106, and/or to a remote, off-board database or processor via the transmitter 103, for use in prioritizing points of interest for display in the future in the user's vehicle and/or in other vehicles. By way of example only, the input device 104 may include one or more buttons, switches, rotary knobs, touch screens, touch panels, capacity panels, swipe operations, and/or one or more other types of devices.

The computer system 106 is coupled between the receiver 102, the transmitter 103, the input device 104, the other vehicle systems 109, and the display and notification unit 108. The computer system 106 receives the above-described signals, information, and user inputs from the receiver 102, the transmitter 103, and the input device 104. In a preferred embodiment, the computer system 106 is also preferably coupled (for example, via a communications bus or network) to receive information from or regarding various other vehicle systems 109, for example as to conditions of, required actions pertaining to, and/or other services required for such other vehicle systems 109 (for example, by way of example only, whether a washer fluid of the vehicle is low and should be replenished relatively soon, an oil life of the vehicle is low and the oil requires changing relatively soon, one or more other fluid levels are low and additional fluid is required relatively soon, an air conditioning system or other vehicle system or component requires servicing relatively soon, a light bulb of the vehicle is defective or burned out and needs to be replaced relatively soon, a brake pad of the vehicle is worn out and needs to be replaced relatively soon, and/or there any other vehicle conditions, required actions, and/or other service needs pertaining to the vehicle that may required and/or that may be of interest to the user).

The computer system 106 processes the various signals, information, and user inputs and provides instructions for the display and notification unit 108 to provide an optimized display and notification regarding various points of interest near the vehicle based on user history and preferences, and regarding conditions, actions, and/or other service needs pertaining to the vehicle that may be related to a point of interest near the vehicle. In addition, in certain embodiments, the computer system 106 also provides instructions for the transmission of signals and information by the transmitter 103 to a remote, off-board database or processor for remote, off-board storage or processing.

As depicted in FIG. 1, the computer system 106 includes a processor 110, a memory 112, a computer bus 114, an interface 116, and a storage device 118. The processor 110 performs the computation and control functions of the computer system 106 or portions thereof, and may comprise any type of processor or multiple processors, single integrated circuits such as a microprocessor, or any suitable number of integrated circuit devices and/or circuit boards working in cooperation to accomplish the functions of a processing unit. During operation, the processor 110 executes one or more programs 113 preferably stored within the memory 112 and, as such, controls the general operation of the computer system 106.

The processor 110 receives the above-referenced signals, information, and user inputs from the receiver 102, the input device 104, and the other vehicle systems 109. The processor 110 processes the signals, information, and user inputs and provides instructions to the display and notification unit 108 to provide an optimized display and notification regarding various points of interest near the vehicle based on user history and preferences, and regarding conditions, actions, and/or other service needs pertaining to the vehicle that may be related to a point of interest near the vehicle. In addition, in certain embodiments, the processor 110 also provides instructions for the transmission of signals and information by the transmitter 103 to a remote, off-board database or processor for remote storage or processing.

The processor 110 performs these functions in accordance with the steps of the process 200 depicted in FIGS. 2A and 2B and described further below in connection therewith. In addition, in one exemplary embodiment, the processor 110 performs these functions by executing one or more programs 113 stored in the memory 112.

In executing these steps, the processor 110 preferably also utilizes a database 115 that is also stored in the memory 112. The database 115 preferably includes an identification of various points of interest (such as restaurants, service stations, hotels, attractions, and other points of interest) and information pertaining thereto (such as a vehicle history with respect to such points of interest and/or ratings and/or other preferences from the occupants of the vehicle and/or from others pertaining to the points of interest). In certain embodiments, the database (115) could also be off-board the vehicle (for example on a remote computer system) and accessed via the transmitter 103 and the receiver 102. Again, I believe this is covered in subsequent paragraphs but just including for confirmation/clarification.

The memory 112 can be any type of suitable memory. This would include the various types of dynamic random access memory (DRAM) such as SDRAM, the various types of static RAM (SRAM), and the various types of non-volatile memory (PROM, EPROM, and flash). In certain embodiments, the memory 112 is located on and/or co-located on the same computer chip as the processor 110. It should be understood that the memory 112 may be a single type of memory component, or it may be composed of many different types of memory components. In addition, the memory 112 and the processor 110 may be distributed across several different computers that collectively comprise the computer system 106. For example, a portion of the memory 112 may reside on a computer within a particular apparatus or process, and another portion may reside on a remote computer off-board and away from the vehicle.

The computer bus 114 serves to transmit programs, data, status and other information or signals between the various components of the computer system 106. The computer bus 114 can be any suitable physical or logical means of connecting computer systems and components. This includes, but is not limited to, direct hard-wired connections, fiber optics, infrared and wireless bus technologies.

The interface 116 allows communication to the computer system 106, for example from a vehicle occupant, a system operator, a remote, off-board database or processor, and/or another computer system, and can be implemented using any suitable method and apparatus. In certain embodiments, the interface 116 receives input from an occupant of the vehicle, preferably via the input device 104 of FIG. 1.

The storage device 118 can be any suitable type of storage apparatus, including direct access storage devices such as hard disk drives, flash systems, floppy disk drives and optical disk drives. In one exemplary embodiment, the storage device 118 is a program product from which memory 112 can receive a program 113 that executes the process 200 of FIGS. 2A and 2B and/or steps thereof as described in greater detail further below. Such a program product can be implemented as part of, inserted into, or otherwise coupled to the navigation system 100. As shown in FIG. 1, the storage device 118 can comprise a disk drive device that uses disks 120 to store data. As one exemplary implementation, the computer system 106 may also utilize an off-board/off-vehicle Internet website, for example for providing or maintaining data or performing operations thereon.

It will be appreciated that while this exemplary embodiment is described in the context of a fully functioning computer system, those skilled in the art will recognize that certain mechanisms of the present disclosure may be capable of being distributed using various computer-readable signal bearing media. Examples of computer-readable signal bearing media include: flash memory, floppy disks, hard drives, memory cards and optical disks (e.g., disk 120). It will similarly be appreciated that the computer system 106 may also otherwise differ from the embodiment depicted in FIG. 1, for example in that the computer system 106 may be coupled to or may otherwise utilize one or more remote, off-board computer systems and/or other navigation systems. As used throughout this application, a remote computer system refers to a computer system that is off-board and outside the vehicle. For example, a remote computer system may be at a central processing facility for use with a number of different vehicles, among other possible examples.

The display and notification unit 108 is coupled to the computer system 106. In a preferred embodiment, the display and notification unit 108 comprises a visual component 122 (preferably a display screen, such as a liquid crystal display (LCD) screen) that generates images that are visible to occupants of the vehicle and an audio component 124 (such as a speaker) that generates sounds that can be heard by the occupants of the vehicle. It will be appreciated that the display and notification unit 108 may comprise one or more visual components 122 and/or audio components 124 together as one system and/or as separate systems.

The display and notification unit 108 provides an optimized display and notification regarding various points of interest near the vehicle based on user history and preferences, and regarding conditions, actions, and/or other service needs pertaining to the vehicle that may be related to a point of interest near the vehicle. The visual component 122 preferably displays a list of various points of interest near the vehicle that is prioritized based on a user history and/or other preferences of the user and/or of others, along with information (for example, an address, telephone number, rankings, and/or other information) pertaining to the points of interest.

The visual component 122 also preferably provides a visual notification, when appropriate, as to a state of the vehicle and/or a required action pertaining to the vehicle when the vehicle is proximate a related point of interest. For example, if the vehicle's oil needs to be changed and the vehicle is parked near an oil change service center, then the visual component 122 displays a visual notification suggesting that the oil be changed.

The audio component 124 preferably provides an audio notification, when appropriate, as to a state of the vehicle and/or a required action pertaining to the vehicle when the vehicle is proximate a related point of interest. For example, in the above-referenced example, if the vehicle's oil needs to be changed and the vehicle is parked near an oil change service center, then the audio component 124 provides an audio notification suggesting that the oil be changed. In certain embodiments, an audio notification may be provided by the audio component 124 without a video notification being provided by the video component 122, or vice versa.

Figure 2A:
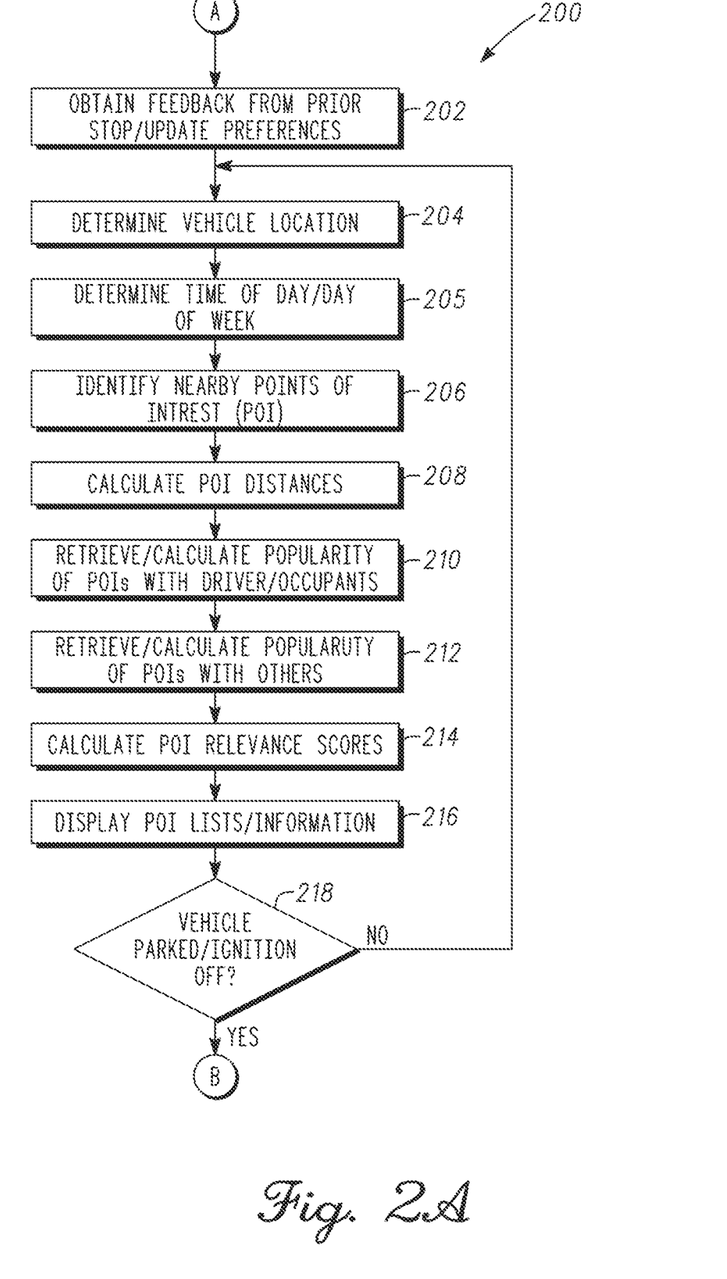
FIGS. 2A and 2B depict a flowchart of a process for providing information to occupants of the vehicle, and that can be implemented in connection with the navigation system of FIG. 1, in accordance with an exemplary embodiment.
Figure 2B:
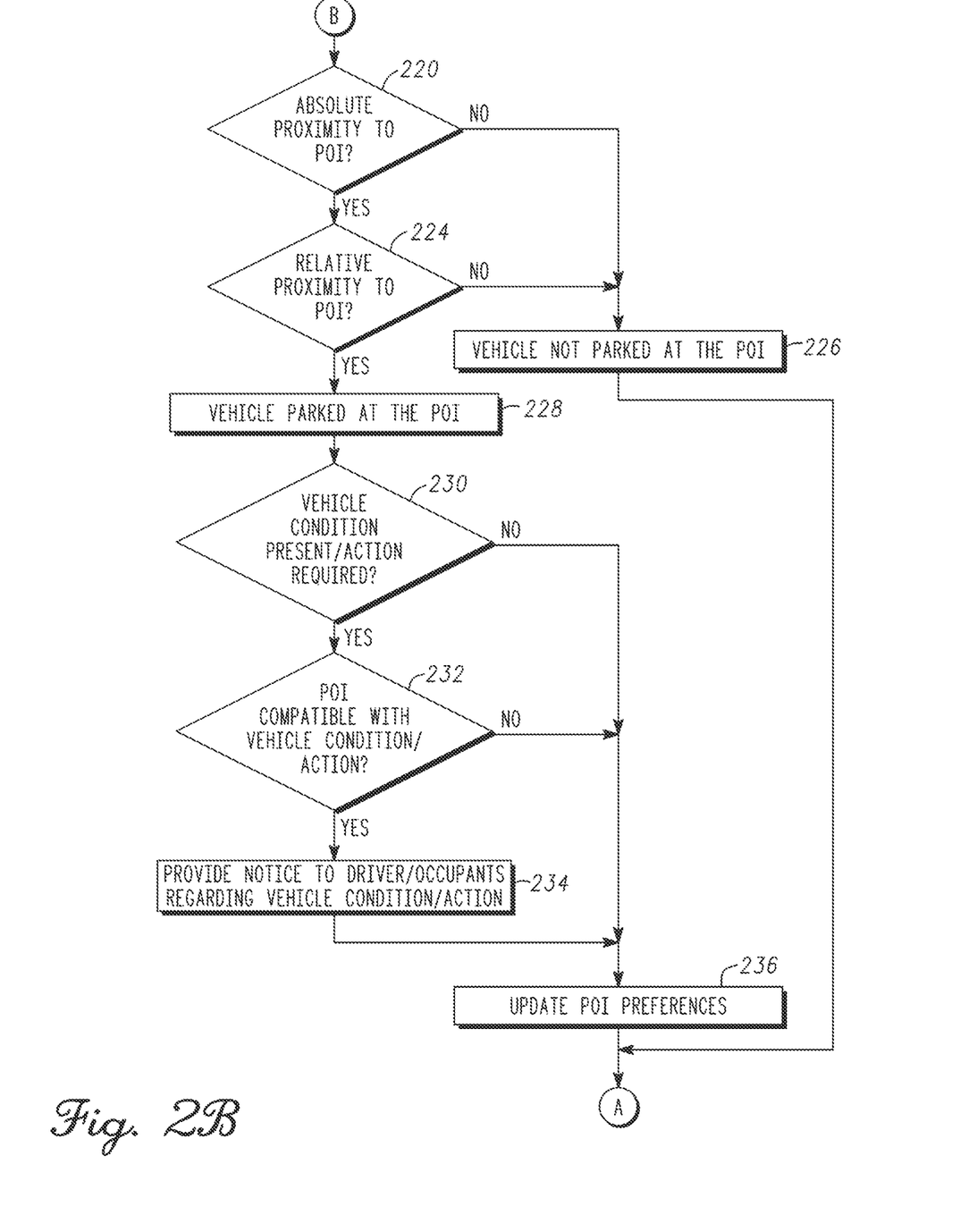

FIGS. 2A and 2B represent a flowchart of a process 200 for providing information to users of a vehicle, in accordance with an exemplary embodiment. In a preferred embodiment, the process 200 can be implemented in connection with the navigation system 100 of FIG. 1.

As depicted in FIGS. 2A and 2B, the process 200 includes the step of obtaining feedback from a prior vehicle stop (step 202). The feedback preferably includes information as to which point of interest, if any, the vehicle was parked by or at during a prior vehicle stop. Preferably, each time the vehicle ignition is turned on, the feedback is obtained regarding a point of interest (if any) from the most recent vehicle stop. In this manner, the process generates and updates a user history relating the vehicle and/or its occupants to various points of interest. The user history preferably includes information as to how many times the user (preferably, one or more occupants of the vehicle) has visited specific points of interest (for example, a particular restaurant or chain of restaurants) or particular genres or types of points of interest (for example, a particular chain, type or style of restaurant), and/or other information pertaining thereto (such as how long the user visited the points of interest, the time and day and day of the week of the visits, and the like).

In certain embodiments, the feedback of step 202 may also include preferences of the user as to a level of enjoyment or satisfaction associated with the point of interest. In some situations, the level of enjoyment or satisfaction may be ascertained from the user history, such as how often the user visits a particular point of interest, the length of the visits, and the like. In addition, in certain situations, the user may also provide feedback directly via the input device 104 of FIG. 1 by providing ratings of the point of interest or similar feedback.

For example, if the vehicle was parked at a point of interest for longer than a minimum point of interest-type specific time ("tmin") and less than a maximum point of interest-type specific time ("tmax"), the process may assume that the stop was made to use the goods or services of the detected point of interest. Upon entering the vehicle, the navigation system 100 of FIG. 1 may provide a survey as to the level of satisfaction that the driver or other occupants of the vehicle experienced with the point of interest. The feedback will be used to boost or decrease a popularity or relevancy score of the point of interest manually, and may also be communicated to a remote, off-board database or processor to further incorporate individual user feedback as to specific points of interest. Preferably, the "tmin" and "tmax" values are used to avoid displaying surveys unnecessarily. For example, feedback may be solicited for a restaurant point of interest only if the vehicle was parked at the restaurant for at least fifteen minutes but not more than three hours in one exemplary embodiment. By way of further example, feedback may be solicited for a hotel point of interest only if the vehicle was parked at the hotel for more than six hours in one exemplary embodiment.

In other embodiments, user preference feedback may be obtained entirely without requiring active user input. For example, in one exemplary embodiment, the process takes into account the time spent at the point of interest and the number of times that the vehicle has stopped at the point of interest. The user would not have to 'rate' the point of interest, but the user and other users others could still benefit from this point of interest usage data. In various embodiments, combinations of these and/or other techniques (such as the active user ratings, described above) may be utilized.

In addition, the feedback of step 202 may also include other information that identifies the point of interest and/or goods or services offered at the point interest. For example, the user may provide feedback that identifies a point of interest that might not ordinarily be recognized by a vehicle navigation system or its database, such as the user's home or place of work, or the home or place of work of a friend or relative, among other possible points of interest that may possess a degree of uniqueness for the user. In addition, the user may provide feedback regarding goods or services that are offered at the points of interest. For example, if a particular point of interest (such as the user's home or that of a friend or relative) offers ready access to a type of fluid used in the vehicle, the user may note this during the feedback of step 202 using the input device 104 of FIG. 1, for storage in the database 115 of the memory 112 of FIG. 1 and for processing in the future by the processor 110 of FIG. 1.

The user history and other feedback are preferably processed by the processor 110 of FIG. 1 and stored in the memory 112 of FIG. 1 (preferably in the database 115 thereof). In so doing, the processor 110 of FIG. 1 updates user preferences regarding points of interest for use in prioritizing and displaying points of interest via the display and notification unit 108 of FIG. 1. In certain embodiments, certain storage and/or processing may be performed instead by a remote, off-board database or processor that communicates with the computer system 106 of FIG. 1 via the receiver 102 and the transmitter 103 of FIG. 1.

In addition, a vehicle location is determined (step 204). In a preferred embodiment, the vehicle location comprises a geographic position of the vehicle, and is determined continuously during operation of the vehicle. The vehicle location and/or information pertaining thereto is preferably obtained by the receiver 102 of FIG. 1, most preferably via satellite signals provided by one or more satellites coupled thereto as part of a global positioning system. In certain embodiments, the receiver 102 of FIG. 1 may receive the vehicle location and/or information pertaining thereto from another source, such as from a remote, off-board processor or system. Also in a preferred embodiment, the receiver 102 provides a signal indicative of the vehicle location to the processor 110 of the computer system 106 of FIG. 1 for processing.

In certain embodiments, a current time of day and day of the week are also determined (step 205). Preferably the current time of day and day of the week are determined by the processor 110 of FIG. 1.

Various points of interest are identified that are near the vehicle (step 206). The points of interest are preferably identified by the processor 110 of FIG. 1 from a collection of points of interest stored in the database 115 of FIG. 1 continuously during operation of the vehicle. In certain embodiments, the collection of points of interest may instead be stored in a remote, off-board database, and/or the identification may be performed by a remote, off-board processor. The points of interest may be identified based at least in part upon a user input provided by one or more occupants of the vehicle, for example as to the type of point of interest that the occupants may be interested in visiting during the current ignition cycle or vehicle ride.

In addition, distances of the various nearby points of interest are calculated (step 208). In one exemplary embodiment, the distance for each point of interest comprises a current distance between the point of interest and the vehicle. In certain embodiments, other factors may also be considered, such as a direction in which the vehicle is currently traveling, a road on which the vehicle is currently travelling, and the like. The distances for the various points of interest are preferably calculated by the processor 110 of FIG. 1 continuously during operation of the vehicle.

Measures of popularity of the various nearby points of interest with respect to the occupants of the vehicle are then retrieved or determined (step 210). Preferably the measures of popularity of step 210 include the above-referenced user history, rankings, and/or other preferences from the feedback obtained in step 202 during the current iteration and all prior iterations of the process. Specifically, each time the feedback is obtained during an iteration of step 202, the user history, rankings, and/or other preferences are preferably stored in the database 115 of the memory 112 of FIG. 1. The user history, rankings, and/or other preferences are then retrieved from the database 115 by the processor 110 of FIG. 1 in subsequent iterations of step 210, preferably both during the current vehicle drive or ignition cycle and in all subsequent drives or ignition cycles of the vehicle. In certain embodiments, the user history, rankings, and/or other preferences may instead by obtained by the processor 110 of FIG. 1 from a remote, off-board database or processor via the receiver 102 of FIG. 1 during step 210.

In certain embodiments, measures of popularity of the various nearby points of interest with respect to other individuals may also be retrieved or determined (step 212). Preferably the measures of popularity of step 212 include rankings and/or other preferences as to the opinions that other individuals may have with respect to the nearby points of interest. For example, if the user is currently looking for a specific type of restaurant, the measures of popularity of step 212 may include rankings of other individuals as to their dining experiences with particular restaurants and/or restaurant chains that fit the description of the type of restaurant for which the user is currently looking.

The measures of popularity of step 212 may also be used to identify points of interest in other cities (for example, when the user is on vacation) that that may be similar to points of interest in the user's home city (for example, by identifying a particular restaurant in the vacation city that may be similar to a restaurant that the user enjoys in his or her home city). The measures of popularity of step 212 may be obtained by the processor 110 of FIG. 1 from a remote, off-board database or processor via the receiver 102 of FIG. 1 during step 212. In certain embodiments, the user feedback and preferences of the occupants of the vehicle (obtained in step 202) may be transmitted to the remote, off-board database or processor by the transmitter 103 of FIG. 1 (via instructions provided thereto by the processor 110 of FIG. 1) for similar use for other users in other vehicles.

The preferences of others in step 212 preferably pertain to preferences of other individuals or groups of individuals with similar preferences or characteristics of the user of the vehicle for which the process is currently being performed. Preferably this is achieved by aggregating preferences from several users and dividing them into preference groups. This can be used by the process in ascertaining patterns in the typical behavior across several users. In one embodiment, the navigation system 100 of FIG. 1 is connected for this purpose to a telematics system that sends vehicle specific popularity counter data to a remote, off-board database or processor and receives group preferences from the remote, off-board database or processor.

A relevancy score is then calculated for the nearby points of interest (step 214). The relevancy score is preferably calculated using the popularity measures of steps 210 and/or 212 and the distances of step 208.

Specifically, the points of interest with a more favorable user history and/or rankings from the user, and/or with more favorable rankings from others (such as other individuals having similar tastes or preferences as the user), are provided with higher relevancy scores. The relevancy scores preferably take into account a point of interest popularity counter and a distance from the present location of the vehicle to the point of interest. The popularity counter preferably increments in step 236 (described further below) or in step 202 (described above) every time the vehicle is determined to be parked at the point of interest. A larger popularity counter value for a particular point of interest preferably corresponds to a higher relevancy score for that point of interest. In addition, a smaller distance from the present location of the vehicle to a particular point of interest preferably results in a higher score for that point of interest.

The relevancy scores of step 214 may also be calculated using the current time of day and/or day of the week as determined in step 205. For example, if the user is looking for a restaurant and the time of day is early morning, a higher relevancy score may be provided to a restaurant that is known for breakfast service, and/or that the user has frequented often during the early mornings. By way of further example, if the day of the week is a weekend day, then a higher relevancy score may be provided to a restaurant that is known for weekend service, and/or that the user has frequented often during the weekends.

In one embodiment, for points of interest that are part of generic groups (such as different locations of a restaurant chain), the popularity or relevancy scores for such points of interest are aggregated for the group in order to compare group popularity (for example, for all of the different locations of the restaurant chain). This aggregation process can take place through several levels of a predetermined hierarchy. For example, different fast food restaurants and/or fast food restaurant chains may also be aggregated into a fast food category to generate a fast food popularity or relevancy measure. By way of further example, fast food restaurants and/or fast food restaurant chains may also be aggregated with other family style restaurants and/or family style restaurant chains to generate a family dining popularity or relevancy measure, and so on.

The relevancy scores are preferably calculated by the processor 110 of FIG. 1 continuously during operation of the vehicle. Preferably the processor 110 of FIG. 1 calculates relevancy scores for the n closest points of interest identified in step 206, such that at least n points of interest with a popularity score greater than zero are included, wherein n represents the number of points of interest presented on a first page of the display and notification unit 108 of FIG. 1.

The nearby points of interest are then sorted and displayed in accordance with their relevancy scores (step 216). Preferably, the points of interest are sorted (or prioritized) and provided in descending order with the highest relevancy scores listed first. For example, while traditional navigation systems present points of interest in ascending distance from the present vehicle position, the sorted or "best guess" results of the process 200 are displayed based on the calculated relevancy scores, which take into account the point of interest popularity counter (the higher the counter, the higher the relevancy score) and its distance from the present location of the vehicle (the farther away, the lower the relevancy score). This sorting can save the user time and effort by minimizing the time it takes to view the points of interest that are likely to be of the most interest to the user. In addition, this sorting also provides the user with the opportunity to view the most relevant points of interest without scrolling through the navigation display or with reduced scrolling. In certain vehicles in which scrolling through the navigation display is not permitted while the vehicle is moving, this sorting may enable the user to view various relevant points of interest that the user might not otherwise have been able view while the vehicle is moving.

During step 216, the sorted (or prioritized) list of nearby points of interest is displayed for the user by the display and notification unit 108 of FIG. 1. The sorted (or prioritized) list is preferably displayed for the user by the visual component 122 (for example a display screen, such as liquid crystal display (LCD) screen) of the display and notification unit 108 of FIG. 1 based on instructions provided thereto by the processor 110 of FIG. 1 continuously while the vehicle is being operated. In addition, during step 216, preferably the above-referenced n points of interest are displayed in descending order of their relevancy scores. Ideally the driver will find his or her destination among the few n points of interest presented on the first page, but can also access the traditional list of points of interest by distance in a subsequent screen if desired.

A determination is also made as to whether a vehicle is parked or has otherwise reached a destination (step 218). In a preferred embodiment, the vehicle is determined to be parked if the vehicle is stopped or nearly stopped near a point of interest. The determination as to whether the vehicle is parked is preferably made continuously during operation of the vehicle. In one exemplary embodiment, this determination is made by the processor 110 of FIG. 1 based on whether the ignition of the vehicle is turned off, for example based on information obtained via one of the other vehicle systems 109 of FIG. 1.

In other embodiments, information form other sensors and/or vehicle systems 109 may be utilized, such as, by way of example only, whether a door ajar switch (for example, indicating that the driver or passengers are preparing to exit the vehicle), or a combination of sensors provide information that the vehicle is likely to have reached its destination. By way of further example, in certain embodiments, such information may pertain to whether a driver window is down while the vehicle is stopped or nearly stopped. Such a scenario may represent, for example, that the vehicle is approaching a drive-thru window (for example, for food, a bank, dry cleaning, and/or other drive-thru services). The event could be triggered for example, when the driver door window is lowered by at least a predetermined amount (for example, at least seventy five percent down, although the predetermined amount may vary) while the vehicle is traveling with a speed that is less than a predetermined speed (for example, five miles per hour, although the predetermined speed may vary), and may be deemed to be completed when the vehicle speed rises above the predetermined speed again. The assessment of the point of interest proximity could be executed when this scenario is triggered (or when other such scenarios are triggered), similar to the ignition off scenario described above.

If the vehicle is not determined to be parked (or to have reached its destination), the process returns to step 204. Steps 204-218 repeat, preferably continuously, in various iterations until there is a determination in an iteration of step 218 that the vehicle is parked (or has reached its destination).

Once there is a determination in an iteration of step 218 that the vehicle is parked (or has reached its destination), another determination is made as to whether the vehicle is in an absolute proximity to a point of interest (step 220). In one exemplary embodiment, the vehicle is determined to be in an absolute proximity to the point of interest if the vehicle is parked within a predetermined distance from the point of interest. In one such embodiment, the predetermined distance for step 220 is approximately three hundred feet. However, the predetermined distance may vary in other embodiments. The determination as to whether the vehicle is in an absolute proximity to the point of interest is preferably determined by the processor 110 of FIG. 1 based on the distances calculated during step 208.

In addition, another determination is made as to whether the vehicle is in a relative proximity to a point of interest (step 224). In one exemplary embodiment, the vehicle is determined to be in a relative proximity to a point of interest if the distance from the vehicle to the closest point of interest divided by the vehicle's distance to a next closest point of interest (preferably of the same type as the closest point of interest) is less than a predetermined threshold. In one such embodiment, the predetermined threshold for step 224 is equal to one half, or 0.5. However, the predetermined threshold may vary in other embodiments. The determination as to whether the vehicle is in a relative proximity to the point of interest is preferably determined by the processor 110 of FIG. 1 based on the distances calculated during step 208. The determination of relative proximity in step 224 may not be necessary in all embodiments or situations, but may be particularly useful, for example, in urban areas with limited parking space and a high concentration of points of interest. In a preferred embodiment, the determinations of steps 220 and 224 are conducted independently of whether the navigation system 100 of FIG. 1 (or a routing function thereof) has been used to reach the point of interest or destination.

If it is determined in step 220 that the vehicle is not in an absolute proximity to a point of interest or in step 224 that the vehicle is not in a relative proximity to a point of interest, then a determination is made that the vehicle is not parked at an identifiable point of interest (step 226). This determination is preferably made by the processor 110 of FIG. 1. The process then re-starts with step 202, preferably the next time the ignition of the car is turned on.

Conversely, if it is determined both in step 220 that the vehicle is in an absolute proximity to a point of interest and in step 224 that the vehicle is also in a relative proximity to the same point of interest, then a determination is made that the vehicle is parked at an identifiable point of interest (step 228). This determination is preferably made by the processor 110 of FIG. 1. In certain embodiments, a determination may be made that the vehicle is parked at multiple points of interest.

A determination is then made as to whether a vehicle condition is present, a vehicle action is required that the user may need to be made aware of, and/or there are other service needs for the vehicle (step 230). Such vehicle conditions, actions, or other service needs may include, by way of example only, whether a washer fluid of the vehicle is low and should be replenished relatively soon, an oil life of the vehicle is low and the oil requires changing relatively soon, one or more other fluid levels are low and additional fluid is required relatively soon, an air conditioning system or other vehicle system or component requires servicing relatively soon, a light bulb of the vehicle is defective or burned out and needs to be replaced relatively soon, a brake pad of the vehicle is worn out and needs to be replaced relatively soon, and/or there any other vehicle conditions, required actions, or other service needs pertaining to the vehicle that the user may need to be made aware of. Multiple determinations may be made if there are more than one vehicle conditions, actions, and/or other service needs that the user may need to be made aware of. These determinations are preferably made by the processor 110 of FIG. 1.

If it is determined in step 230 that a vehicle condition is present, a vehicle action is required, or the vehicle has other service needs that the user may need to be made aware of, then a determination is made as to whether the point of interest is compatible with the vehicle condition, action, or other service need (step 232). The point of interest preferably corresponds to the point of interest at which the vehicle is parked, as determined in step 228, and the vehicle condition, action, or other service need preferably correspond to the vehicle condition, action, or other service need as determined in step 230. In one embodiment, the point of interest is deemed to be compatible with a vehicle condition, action, or other service need if the point of interest offers goods and services pertaining to the vehicle condition, action, or other service need, and/or if the vehicle condition can be remedied or the vehicle action or other service need performed at the point of interest. For example, if the oil life of the vehicle is low and the vehicle is parked near a service station that provided oil changes or near an automobile supply store that sells motor oil, then the service station would be deemed to be compatible with the vehicle condition, action, or other service need, and so on. The determination of step 232 is preferably made by the processor 110 of FIG. 1. In one embodiment, the processor 110 of FIG. 1 compares the present vehicle conditions, actions, or other service needs with a list of products and services offered at the matching point of interest that are stored in the database 115 of the memory 112 of FIG. 1.

If it is determined in step 232 that the point of interest is compatible with the vehicle condition, action, or other service need, a notification is provided to the occupants of the vehicle (step 234). The notification informs the occupants of the vehicle regarding the vehicle condition, recommended action, or other service need. In certain embodiments, the notification also provides the name of the point of interest at which the vehicle condition can be remedied or the recommended vehicle action or other service need performed, among other possible information. Multiple notifications may be provided if the point of interest corresponds to more than one vehicle condition, action, and/or other service need, and/or if multiple points of interest are identified that correspond to different vehicle conditions, actions, and/or other service needs.

By way of example only, (i) if the washer fluid of the vehicle is low, a notification may be provided that recommends that the user replenish the washer fluid if the vehicle is parked near a service station or retail sore known to carry washer fluid for motor vehicles; (ii) if the oil life is low, a notification may be provided that recommends that the user purchase engine oil or oil change services (preferably also suggesting a recommended oil type for the vehicle) if the vehicle is parked near a service station or retail store known to carry engine oil for motor vehicles or oil change services for motor vehicles; (iii) if the vehicle has a defective light bulb, a notification may be provided that recommends that the user replace the defective light bulb (preferably including specific information regarding the location and type of the defective light bulb) if the vehicle is parked at a service station or retail store known to carry the required light bulb; (iv) if the vehicle has a worn brake pad, a notification may be provided that recommends that the vehicle brakes be serviced if the vehicle is parked at a service station or other facility known to offer brake service, and so on.

The notification of step 234 is preferably provided by the display and notification unit 108 of FIG. 1 via instructions provided thereto by the processor 110 of FIG. 1. In one embodiment, a visual notification is provided for the occupants of the vehicle via the visual component 122 of FIG. 1, such as via an LCD display screen. In another embodiment, an audio notification is provided for the occupants of the vehicle via the audio component 124 of FIG. 1, such as via a speaker inside the vehicle. In yet other embodiments, a visual notification may be provided via the visual component 122 of FIG. 1 along with an audio notification provided via the audio component 124 of FIG. 1.

Conversely, if there is a determination in step 230 that there are no vehicle conditions, actions, or other service needs that the occupants need to be made aware of, or if there is a determination in step 232 that the point of interest is not compatible with the vehicle condition, action, or other service need, then no notifications are provided for the occupants of the vehicle. This helps to increase the value of the notifications when the vehicle is parked near a compatible point of interest by providing situational relevant reminder notifications, and helps to avoid problems which may occur if the user were notified regarding every vehicle condition, recommended vehicle action, or other service need every time the ignition of the vehicle is turned off, which could be a nuisance and lead to a habit of ignoring the reminder. Instead, the process provides timely notification of the vehicle conditions, recommended actions, and other service needs when the vehicle is parked at or near a point of interest that can provide the relevant services or products to fix the underlying problem. Of course, in certain situations in which the notifications are particularly urgent, the notifications may still be provided more often regardless of the location of the vehicle.

Regardless of the determinations of steps 230 and 232, the user history and preferences are preferably updated (step 236). During step 236, the user history and preferences are updated to reflect the fact that the vehicle is parked at a particular point of interest. In one embodiment, with every match or determination that the vehicle was parked at a particular point of interest in step 228, the process (and the navigation system 100 of FIG. 1) automatically increases a popularity counter for the detected point of interest. Following step 228, the process then starts again with a new iteration beginning with step 202 (preferably after the next time the ignition of the vehicle is turned back on), as the user feedback regarding the point of interest is obtained.

It will be appreciated that the disclosed systems and processes may differ from those depicted in the Figures and/or described above. For example, the navigation system 100 and/or various parts and/or components thereof may differ from those of FIG. 1 and/or described above. Similarly, certain steps of the process 200 may be unnecessary and/or may vary from those depicted in FIGS. 2A and 2B and described above. It will similarly be appreciated that various steps of the process 200 may occur simultaneously or in an order that is otherwise different from that depicted in FIGS. 2A and 2B and/or described above. It will similarly be appreciated that, while the disclosed methods and systems are described above as being used in connection with automobiles such as sedans, trucks, vans, and sports utility vehicles, the disclosed methods and systems may also be used in connection with any number of different types of vehicles, and in connection with any number of different systems thereof and environments pertaining thereto.

Accordingly, methods and systems are disclosed for providing information and notifications to occupants of vehicles via vehicle navigation systems. The disclosed methods and systems provide an optimized display for the vehicle occupants regarding various points of interest near the vehicle based on user history and preferences. In addition, the disclosed methods and systems provide an optimized notification to occupants of the vehicle when the vehicle is parked in close proximity to a point of interest offering goods or services that can be utilized in correcting particular vehicle conditions that may exist and/or in performing any vehicle actions and/or other service needs that may be recommended.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method comprising the steps of:
    receiving, via a receiver, geographic position information as to a geographic position of a vehicle with respect to a location of a service provider that provides a service for the vehicle;
    determining, using a processor using the geographic position information obtained by the receiver, if a vehicle is parked proximate the location of the service provider that provides the service for the vehicle;
    subsequent to the determination that the vehicle is parked proximate the location of the service provider, determining, using the processor, if the vehicle requires the service offered by the service provider at the location; and
    providing a notification that the vehicle requires the service and is proximate the location of the service provider, if and only if both of the following conditions are satisfied, namely that (i) the vehicle requires the service and (ii) the vehicle is parked proximate the location at which the service can be performed by the service provider as determined using the geographic position information from the receiver.

2. The method of claim 1, wherein:
    the vehicle has an ignition;
    the step of determining if the vehicle is parked proximate the location further comprises the step of determining, via a processor using ignition information as well as the geographic position information obtained by the receiver, if the ignition is turned off while the vehicle is proximate the location at which the service can be performed by the service provider; and
    the step of providing the notification comprises providing the notification that the vehicle requires the service and is proximate the location, if and only if both of the following conditions are satisfied, namely that (i) the vehicle requires the service and (ii) the ignition is turned off while the vehicle is proximate the location at which the service can be performed by the service provider.

3. The method of claim 1, wherein:
    the step of determining if the vehicle is parked proximate the location further comprises the step of determining, via a processor using the geographic position information obtained by the receiver, if the vehicle is within a predetermined threshold distance from the location at which the service can be performed by the service provider; and
    the step of providing the notification comprises providing the notification that the vehicle requires the service and is proximate the location, if and only if both of the following conditions are satisfied, namely that (i) the vehicle requires the service and (ii) the vehicle is parked within a predetermined distance from the location at which the service can be performed by the service provider.

4. The method of claim 3, wherein the notification is not provided if the vehicle is not determined to be parked proximate the location at which the service can be performed by the service provider.

5. The method of claim 1, wherein the step of providing the notification comprises the step of:
    providing a visual notification that the vehicle requires the service and is proximate the location, provided that both of the following conditions are satisfied, namely that (i) the vehicle requires the service and (ii) the vehicle is parked proximate the location at which the service can be performed by the service provider.

6. The method of claim 1, wherein the step of providing the notification comprises the step of:
    providing an audio notification that the vehicle requires the service and is proximate the location, if and only if both of the following conditions are satisfied, namely that (i) the vehicle requires the service and (ii) the vehicle is parked proximate the location at which the service can be performed by the service provider.

7. The method of claim 1, wherein:
    the step of determining if the vehicle is parked proximate the location further comprises determining, via a processor using the geographic position information obtained by the receiver, if a vehicle is parked proximate a location that provides a service for sale;
    the step of determining if the vehicle requires the service comprises subsequent to the determination that the vehicle is parked proximate the location, determining, using the processor, if the vehicle requires the service offered at the location for sale; and
    the step of providing the notification comprises providing a notification that the vehicle requires the service and is proximate the location, if and only if both of the following conditions are satisfied, namely that (i) the vehicle requires the service for sale and (ii) the vehicle is parked proximate the location at which the service is offered for sale.

8. The method of claim 1, wherein:
    the step of determining if the vehicle is parked proximate the location further comprises determining, via a processor using the geographic position information obtained by the receiver, if a vehicle is parked proximate a location that provides a repair service for the vehicle;
    the step of determining if the vehicle requires the service comprises subsequent to the determination that the vehicle is parked proximate the location, determining, using the processor, if the vehicle requires the repair service offered at the location; and
    the step of providing the notification comprises providing a notification that the vehicle requires the service and is proximate the location, if and only if both of the following conditions are satisfied, namely that (i) the vehicle requires the repair service and (ii) the vehicle is parked proximate the location at which the repair service is performed.

9. The method of claim 1, wherein:
    the step of determining if the vehicle is parked proximate the location further comprises determining, via a processor using the geographic position information obtained by the receiver, if a vehicle is parked proximate a location that provides a maintenance service for the vehicle;

the step of determining if the vehicle requires the service comprises subsequent to the determination that the vehicle is parked proximate the location, determining, using the processor, if the vehicle requires the maintenance service offered at the location; and the step of providing the notification comprises providing a notification that the vehicle requires the service and is proximate the location, if and only if both of the following conditions are satisfied, namely that (i) the vehicle requires the maintenance service and (ii) the vehicle is parked proximate the location at which the maintenance service is performed.

10. The method of claim 9, wherein:

the step of determining if the vehicle is parked proximate the location further comprises determining, via the processor using the geographic position information obtained by the receiver, if the vehicle is parked proximate a location that provides an oil change service for the vehicle;

the step of determining if the vehicle requires the maintenance service comprises, subsequent to the determination that the vehicle is parked proximate the location, determining, using the processor, if the vehicle requires the oil change service; and the step of providing the notification comprises providing a notification that the vehicle requires the oil change service and is proximate the location that provides the oil change service, if and only if both of the following conditions are satisfied, namely that (i) the vehicle requires the oil change service and (ii) the vehicle is parked proximate the location at which the oil change service is performed.

11. The method of claim 9, wherein:

the step of determining if the vehicle is parked proximate the location further comprises determining, via the processor using the geographic position information obtained by the receiver, if the vehicle is parked proximate a location that provides a brake service for the vehicle;

the step of determining if the vehicle requires the maintenance service comprises, subsequent to the determination that the vehicle is parked proximate the location, determining, using the processor, if the vehicle requires the brake service; and the step of providing the notification comprises providing a notification that the vehicle requires the brake service and is proximate the location that provides the brake service, if and only if both of the following conditions are satisfied, namely that (i) the vehicle requires the brake service and (ii) the vehicle is parked proximate the location at which the brake service is performed.

12. A system comprising:

a receiver configured to receive geographic position information as to a geographic position of a vehicle with respect to a location of a service provider that provides a service for the vehicle;

a processor coupled to the receiver and configured to:
 receive vehicle needs information pertaining to needs of a vehicle;
 determine, using the geographic position information obtained by the receiver, if the vehicle is parked proximate the location of the service provider that provides the service for the vehicle; and
 subsequent to the determination that the vehicle is parked proximate the location of the service provider, determine if the vehicle requires the service offered by the service provider at the location; and a display coupled to the processor and configured to provide a notification that the vehicle requires the service and is proximate the location, if and only if both of the following conditions are satisfied, namely that (i) the vehicle requires the service and (ii) the vehicle is parked proximate the location at which the service can be performed by the service provider as determined using the geographic position information from the receiver.

13. The system of claim 12, wherein:

the vehicle has an ignition;

the processor is further configured to determine, using ignition information as well as the geographic position information obtained by the receiver, if the vehicle is parked proximate the location by determining if the ignition is turned off while the vehicle is proximate the location at which the service can be performed by the service provider; and the display is configured to provide the notification if and only if both of the following conditions are satisfied, namely that (i) the vehicle requires the service and (ii) the ignition is turned off while the vehicle is proximate the location at which the service can be performed by the service provider.

14. The system of claim 12, wherein the processor is further configured to determine, using the geographic position information obtained by the receiver, if the vehicle is parked proximate the location based on:

if the vehicle is parked within a predetermined threshold distance from the location at which the service can be performed by the service provider; and a comparison of a first distance between the vehicle and the location at which the service can be performed by the service provider and a second distance between the vehicle and a second location.

15. The system of claim 12, wherein the display comprises a display screen configured to provide a visual notification that the vehicle requires the service and is proximate the location, if and only if both of the following conditions are satisfied, namely that (i) the vehicle requires the service and (ii) the vehicle is parked proximate the location at which the service can be performed by the service provider.

16. The system of claim 12, wherein the display comprises a speaker configured to provide an audio notification that the vehicle requires the service and is proximate the location, if and only if both of the following conditions are satisfied, namely that (i) the vehicle requires the service and (ii) the vehicle is parked proximate the location at which the service can be performed by the service provider.

17. The system of claim 12, wherein:

the processor is further configured to:
 determine if the vehicle is parked proximate a location at which the service is offered for sale using the geographic position information obtained by the receiver; and
 subsequent to the determination that the vehicle is parked proximate the location, determine if the vehicle requires the service offered at the location for sale; and the display is configured to provide the notification that the vehicle requires the service and is proximate the location, if and only if both of the following conditions are satisfied, namely that (i) the vehicle requires the service and (ii) the vehicle is parked proximate the location at which the service is offered for sale.

18. The system of claim 17, wherein the service comprises a maintenance service for the vehicle that is sold by the provider at the location.

19. The system of claim 17, wherein the service comprises an oil change service for the vehicle that is sold by the provider at the location.

20. The system of claim 17, wherein the service comprises a brake service for the vehicle that is sold by the provider at the location.

21. The system of claim 17, wherein the service comprises a repair service for the vehicle that is sold by the provider at the location.

22. A method comprising the steps of:

receiving, via a receiver, geographic position information as to a geographic position of a vehicle with respect to a location of a provider that provides a product for the vehicle;

determining, via a processor using the geographic position information obtained by the receiver, if a vehicle is parked proximate the location of the provider that provides the product for the vehicle;

subsequent to the determination that the vehicle is parked proximate the location of the provider, determining, using the processor, if the vehicle has a condition that requires the product offered by the provider at the location; and providing a notification that the vehicle has the condition and is proximate the location of the provider, if and only if both of the following conditions are satisfied, namely that (i) the vehicle requires the product and (ii) the vehicle is parked proximate the location at which the product is offered by the provider as determined using the geographic position information from the receiver.

23. The method of claim 22, wherein:

the step of determining if the vehicle is parked proximate the location further comprises determining, via the processor using the geographic position information obtained by the receiver, if the vehicle is parked proximate a location of a provider that provides an oil product for the vehicle;

the step of determining if the vehicle has the condition comprises, subsequent to the determination that the vehicle is parked proximate the location of the provider that provides the oil product for the vehicle, determining, using the processor, if the vehicle requires an oil change for which the oil product can be used; and the step of providing the notification comprises providing a notification that the vehicle requires an oil change and is proximate the location of the provider that provides the oil product for the vehicle, if and only if both of the following conditions are satisfied, namely that (i) the vehicle requires the oil change and (ii) the vehicle is parked proximate the location at which the oil change product is offered by the provider.

24. The method of claim 22, wherein:

the step of determining if the vehicle is parked proximate the location further comprises determining, via the processor using the geographic position information obtained by the receiver, if the vehicle is parked proximate a location of a provider that provides a replacement part for the vehicle;

the step of determining if the vehicle has the condition comprises, subsequent to the determination that the vehicle is parked proximate the location of the provider that provides the replacement part for the vehicle, determining, using the processor, if the vehicle has a condition for which the replacement part is used; and the step of providing the notification comprises providing a notification that the vehicle has the condition and is proximate the location, if and only if both of the following conditions are satisfied, namely that (i) the vehicle has the condition for which the replacement part is used and (ii) the vehicle is parked proximate the location at which the replacement part is offered by the provider.

25. A system comprising:

a receiver configured to receive geographic position information as to a geographic position of a vehicle with respect to a location of a provider that provides a product for the vehicle;

a processor coupled to the receiver and configured to:
 receive information pertaining to needs of a vehicle;
 determine, using the geographic position information obtained by the receiver, if the vehicle is parked proximate the location of the provider that provides the product for the vehicle; and
 subsequent to the determination that the vehicle is parked proximate the location of the provider that provides the product for the vehicle, determine if the vehicle has a condition for which the product is used; and a display coupled to the processor and configured to provide a notification that the vehicle has the condition and is proximate the location, if and only if both of the following conditions are satisfied, namely that (i) the vehicle has the condition for which the product is used and (ii) the vehicle is parked proximate the location at which the product is offered by the provider as determined using the geographic position information from the receiver.

26. The system of claim 25, wherein the product comprises a maintenance product for the vehicle that is sold by the provider at the location.

27. The system of claim 25, wherein the product comprises an oil change product for the vehicle that is sold by the provider at the location.

28. The system of claim 25, wherein the product comprises a repair product for the vehicle that is sold by the provider at the location.

29. The system of claim 25, wherein the product comprises a replacement part for the vehicle that is sold by the provider at the location.

* * * * *